Oct. 26, 1965     L. ABRAMSON, JR     3,213,570
PLASTIC BENCH-SEATS
Filed Sept. 12, 1962     2 Sheets-Sheet 1
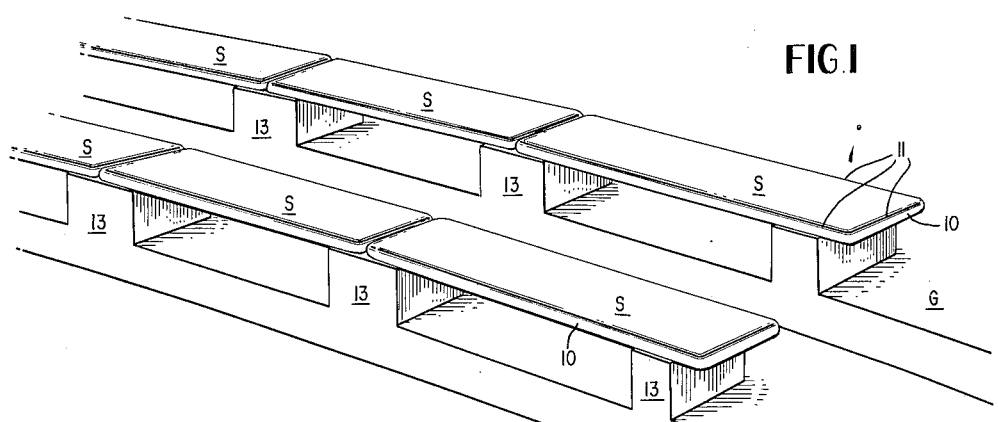
FIG.1
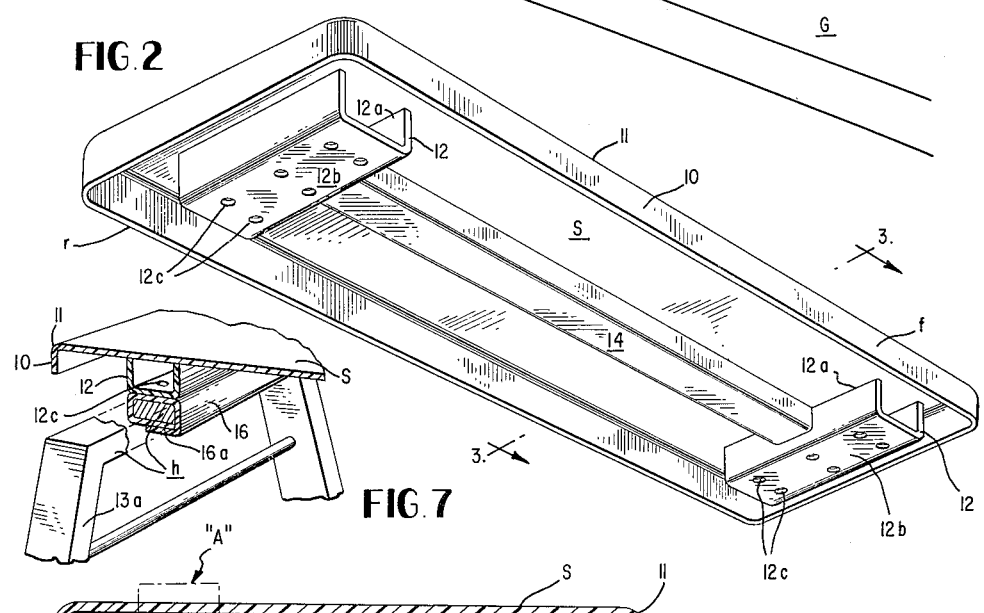
FIG.2
FIG.7
FIG.3
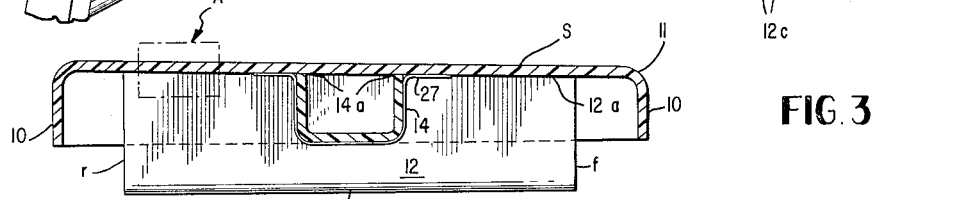
PIGMENTED POLYESTER RESIN ACTIVATED WITH METHYL ETHYL KETON PEROXIDE
RESIN IMPREGNATED WOVEN ROVING
RESIN IMPREGNATED MAT
RESIN IMPREGNATED WOVEN ROVING
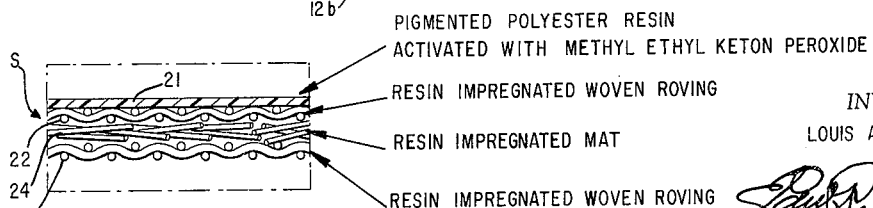
FIG.4
INVENTOR.
LOUIS ABRAMSON, JR.
ATTORNEY Oct. 26, 1965     L. ABRAMSON, JR     3,213,570
PLASTIC BENCH-SEATS
Filed Sept. 12, 1962     2 Sheets-Sheet 2
FIG.5a
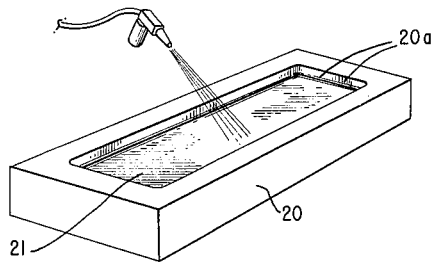
FIG.5b
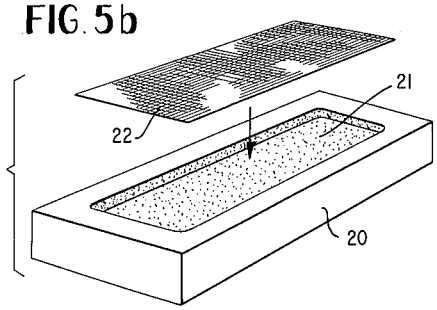
FIG.5c
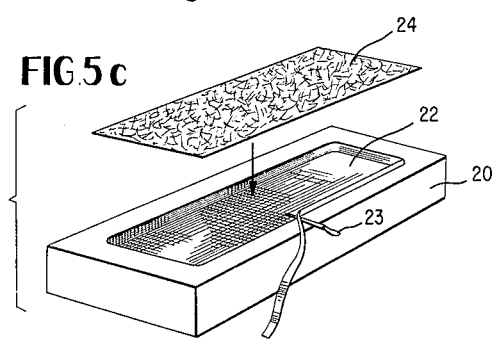
FIG.5d
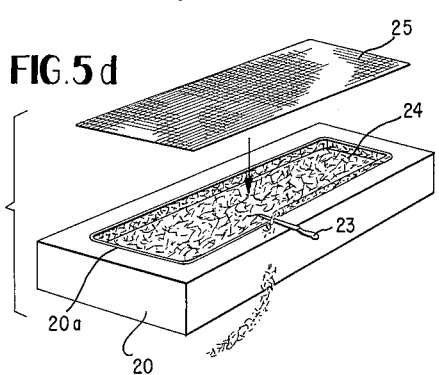
FIG.5e
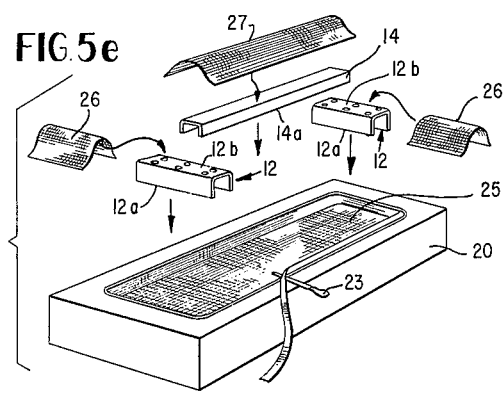
FIG.5f
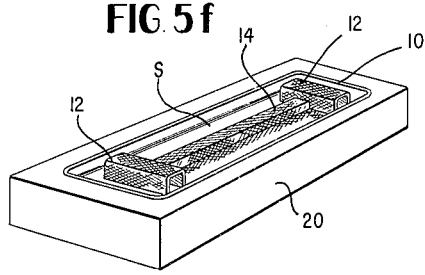
FIG.6
INVENTOR.
LOUIS ABRAMSON, JR.
BY
ATTORNEY United States Patent Office 3,213,570
Patented Oct. 26, 1965

1

3,213,570
PLASTIC BENCH-SEATS
Louis Abramson, Jr., 3522 Jefferson Ave.,
New Orleans, La.
Filed Sept. 12, 1962, Ser. No. 223,134
4 Claims. (Cl. 52—8)

The present invention relates to an improved bench-seat, and its method of attachment, and more particularly concerns the type of bench-seat used in stadia and the like.

Heretofore, bench-seats in stadia and similar places have been constructed of wood and usually comprise a plurality of lengths of narrow and relatively thick wooden strips, generally 2 inches by 4 inches in thickness and width, laid horizontally in parallel and slightly spaced rows with two or three or more boards, upon spaced supports to attain the length and width of the bench desired. The supports may be blocks of wood, or concrete or metal frame members to which the wooden strips are individually attached by bolts and nuts and like fasteners; the bolts must have been attached to the basic concrete or metal first by star drill or similar arrangement. The problems encountered with such wooden bench-seats include the expense of installing and maintaining them; and, due to weather conditions, they deteriorate quickly, becoming splintery and/or damp and soggy and requiring replacement or repair, at least of sections, at too frequent intervals (ordinarily from four to six years) depending upon the quality of the lumber employed and the painting maintenance, if any, they receive.

The broad objective of this invention is to overcome the above mentioned deficiencies and other drawbacks by the provision of a bench-seat having a more attractive appearance and made of a polyester resinous material reinforced with fiberglass which is practically proof against weathering deterioration and which can be installed and maintained at a much lower cost than wooden bench-seats and, further, which permits replacement or repair of sections of the bench-seats to be made as needed with speed and at a nominal cost.

A more specific object of the invention is to provide a bench-seat solely of fiberglass and a polyester resinous material in a manner to be at least equal in strength to, but much lighter in weight than the conventional wooden bench-seat, yet having a degree of resiliency that provides a more restful and relaxing seat; and which is shaped to drain itself to prevent accumulation of, or retention of, liquids, without the use of weep holes, and to be quickly, permanently, and inexpensively applied to existing bench-seat basic supports by an adhesive. It also permits color variety by including pigmentation in the integral seat rather than by surface coating.

Other objects of the invention are obtained by, and the invention resides in, the sundry details of construction and attachment and in the methods hereinafter more fully described and pointed out in the appended claims.

In the drawings, which show the preferred embodiment of the invention as now used:

FIGURE 1 is a perspective of a fragmentary portion of bench-seats usually found in stadia, and the like, equipped with the present invention;

FIGURE 2 is a perspective view of a bench-seat section in accordance with the present invention and illustrating the construction of its under-surface;

FIGURE 3 is a transverse sectional view taken substantially on line 3—3 of FIGURE 2, illustrating the details of the formation of the bench-seat;

FIGURE 4 is a fragmentary sectional view taken at the area "A" of FIGURE 3 and is enlarged to illustrate one manner in which the bench-seat is laminated;

FIGURES 5a to 5f, inclusive, show one method by

2 which the bench-seat may be fabricated and its various parts assembled in position;

FIGURE 6 is an end view of a bench-seat mounted on a seat supporting block by means of an adhesive; and FIGURE 7 is a fragmentary sectional view through a modified form of the bench-seat mounted on a metallic supporting frame.

The bench-seat of my invention is a flat, elongated and rigid board-like member S which is substantially rectangular in shape and constructed of a polyester resin with fiberglass embedded therein for reinforcing purposes.

The seat member S is relatively thin, when compared with wooden boards, and may be, and usually is, in the order of three-sixteenths ($3/16$) of an inch in thickness with its marginal edges extending laterally downward therefrom to form a homogeneous continuous rimming flange 10 of substantial width skirting around the seat member. However, the thickness of the main body portion of the seat member S may be as much as one-half ($1/2$) inch depending upon the length of the member and the distance it spans between supports. For spans of from four to five between supports, a thickness of $3/16$ to $1/4$ inch has been found to be sufficient. The juncture of the marginal flange with the main body of the seat member S is arcuate, as at 11, to provide a rounded surface devoid of shape-edges on its upper or seat face.

The other, or under, face of the seat member S is formed with channel-shaped bolsters 12, of fiberglass-reinforced polyester resin, one being deposed adjacent each end portion of the seat member, respectively, and extends transversely across said under-face and has its side and end portions spaced from the rimming flange 10. The free longitudinal edges 12a of the channel-shaped bolsters are integrally bonded to the under-face of the seat member S and their bottom walls or web portions 12b are substantially flat to form a bearing surface to rest upon and to be secured to vertical supports 13 usually provided for the customary wooden seats. These seat supports 13 are generally concrete blocks or metallic A-type-frame. The depth or height of these bolsters 12 will vary according to the height of the existing supports 13, upon which they are to rest and be secured, in order to position the seat-member S at the customary or desired height. When the bench-seat member S is installed in place, as shown in FIGURES 1 and 6, the bolsters 12 are obscured from view by the depending rimming flange 10.

Also, when the seat member S is to be attached to vertical supports 13 which are at intervals greater than about 30 inches apart, the underside of the seat member 10 is formed with a depending substantially U-shaped reinforcing rib element 14, of a polyester resin reinforced with fiberglass, disposed between the bolsters 12 and extending along its medial longitudinal center with the longitudinal edges of its leg portions homogeneous with said seat member, as at 14a, and, preferably, its ends being bonded to the adjacent walls of the bolsters 12, respectively. The depth of the reinforcing element 14 may be, and preferably is, not greater than the width of the rimming flange 10.

One of the important features of the bench-seat of this invention is that its upper-face slopes slightly toward its front edge when installed, as shown in FIGURES 3 and 6, in order to allow rain and other liquids to drain therefrom. This is accomplished by having the free end edges 12a of the legs of the channel-shaped bolsters 12 of gradual less height from their rear ends $r$ to their forward ends $f$ relative to the flat planar bottom wall 12b, as shown more clearly in FIG. 3, or vice-versa as may be preferred.

The bench-seat of proper length and constructed as above described may be installed upon the top surface of spaced seat supports or legs 13 (which are usually provided along each gradine G of a stadium or the like where bench-seats are employed and which may be existing concrete blocks, wooden and metal blocks after removal of the old seat boards and bolts therefrom) by merely applying and spreading onto the top surfaces of two spaced and adjacent supports 13 a relatively thick layer 15 of a special polyamide activated hydrocarbon adhesive and superposing upon said adhesive the underfaces of the bottom walls 12b of the bolsters 12 with slight pressure. The bottom walls 12b are preferably provided with a plurality of holes 12c extending therethrough, through which the adhesive may extend, when the seat member is pressed downward, to form, in effect, rivets 15a. When the adhesive 15 has hardened, it has securely bonded the seat-member S to the supports 13. As indicated in FIGURE 1, a series of the bench-seat member S may be disposed end-to-end and applied and attached to the underlying supports 13 in the manner just stated with great celerity and by unskilled persons, either in building a stadium anew or replacing existing bench-seats or replacing sections of deteriorated wooden seats.

The adhesive employed to adhere the seat-member sections S to the supports 13 may be a one-hundred percent solid epoxy resin, the reaction product of bisphenol and epichlohydrin, which has been modified and cured by reacting with polyamide resin. This product can be partially filled wtih inert pigments to give a desired color.

When the seat-members S are to be installed upon A-frame supports 13a, as shown in FIGURE 7 (which are usually of metal), it is preferred to have a second and inverted channel anchor element 16, of an uncured fiberglass reinforced polyester material, bonded to the underface of each bolster 12, so as to receive and embrace the horizontal portion h of the support frame 13a. The legs 16a of the anchor element 16 are dimensioned so that they may be wrapped tightly around the horizontal portion h of the support; and by applying to said leg portion 16a a heat activator, such as methyl ethyl keton peroxide, the polyester resin sets or hardens, whereby the overlapping marginal edge portions of the legs 16a become bonded together to firmly secure the seat-member S to the A-shaped supporting frame 13.

Anyone of the approved methods of molding polyester resin may be employed in producing the bench-seat of this invention. However, one method which has been employed in its construction is shown in FIGURES 5a to 5f, respectively, wherein 20 indicates a mold having a molding surface so shaped and dimensioned to produce the seat-member 20 in the size desired and in the form described, which surface is highly polished and waxed.

In carrying out the method, first, a gel-coating 21, of a thermosetting polyester resin, containing a pigment suspended therein and a thermo-activator, such as methylethylketone peroxide, is sprayed onto the molding surface 20a (see FIGURE 5a) to give the exterior color desired for the seat-members S. After the desired thickness of this coating has been attained, it is permitted to harden. Secondly, a length of woven roving fiberglass 22, which has been impregnated with activated thermosetting polyester resin (preferably without pigment), is laid in the mold 20 upon the hardened coating layer 21 (FIGURE 5b), and is, then, rolled with a roller in the mold to eliminate air bubbles and trimmed to the exact dimensions of the molding surface 20a by a knife 23 (see FIGURE 5c). Thirdly, a length of fiberglass mat 24, which has been impregnated with the activated thermosetting polyester resin, is laid into the mold 20 onto the impregnated roving 22 and is rolled and trimmed to the molding surface as shown in FIGURE 5d. Fourthly, a second length of fiberglass woven roving 25, which has been impregnated the same as the layers 22 and 24, is laid in the mold and rolled and trimmed (see FIGURE 5e). Fifthly, a pair of channel-shaped bolsters 12 and, if required, a U-shaped longitudinal reinforcing element 14, such as previously described and which have been formed in molds (not shown) in the same manner as just described, in connection with FIGURES 5b, 5c and 5d, are arranged as shown in FIGURE 5e and applied to the composite layers 21, 22, and 24 in the mold 20, in the manner shown in FIGURE 5f, before these layers have hardened or set, thus permitting the bolsters 12 and reinforcing element 14 to become integrally homogeneous with the seat-member S. To assure this homogeneity and to give additional strength, I prefer to apply over and onto the bolsters 12 and the reinforcing element 14 and adjacent areas of the under surface of the seat-member S, swatches or patches of woven roving of fiberglass 26 and 27 which have been impregnated with the activated thermosetting polyester resin.

The lengths of fiberglass roving and mat material may be impregnated with the polyester resin by means of a brush until thoroughly saturated therewith.

Now, all that is required, to obtain the completed bench-seat of this invention and ready for installation, is to allow the contents within the mold 20 to harden and, because of the prior preparation of the mold, the finished bench-seat will automatically separate from the mold 20, when it is completely dry, and may be readily removed from it.

Other methods of fabricating the bench-seat may be employed, such as pressure-bag molding, match-die molding, compression molding and the like.

The polyester resin used is a resilient, promoted, tack-free thixotropic resin, "resilient" meaning opposed to rigid; "promoted" meaning that aniline or cobalt napthenate, or both, had been added to accelerate the thermosetting action, when initiated by the methylethylketone peroxide; "tack-free" meaning being free of stickiness when it sets or dries; and "thixotropic" meaning having the property of stickiness without flowing or running.

From the above it is clear that the bench-seat of this invention has many advantages over bench-seats now employed. Among these advantages are that the bench-seats are unitary in width and length, are lighter in weight than wooden bench-seats and are much less expensive to install; that they require no maintenance since they are practically permanent, with the color incorporated in the material composing the seat; that they are sturdy and durable, due to their manner of reinforcement by the rimming-flange 10 and element 14, yet more comfortable and seat-conforming due to their design; that they may be quickly secured to existing seat-posts, blocks, A-frames or other supports with an adhesive, thus eliminating the use of nails, bolts and other types of metallic and corrodible fasteners; that they have a more pleasing and smooth appearance, due to the texture and color possibilities, which may be utilized to make the seating problem more convenient by matching ticket-colors with the colors of the seat, by section; that any single length of the bench-seats may be removed and replaced in a few minutes of time and that the bench-seats do not become soggy or splintery.

Having thus described the invention and the manner in which it is to be performed, it is to be understood that certain change or modifications may be made in the same from the exact form shown and described herein and which fall within the scope of the appended claims.

That which is claimed, as new and to be secured by Letters Patent, is:

1. An improved article of manufacture for use as bench-seat means for a gradine of a stadium or the like having a plurality of vertical supporting elements spaced therealong and rising therefrom and each element having a bearing surface for supporting a horizontally disposed seat member thereupon; said article comprising an elongated unitary board-like seat member of a polyester resinous material having fiberglass incorporated therein and forming a smooth planar upper seat-surface with its marginal edge portions extending downwardly to form a continuous and homogeneous rimming reinforcing flange skirting said seat member, the juncture of said flange with the seat-surface being arcuate at least at the forward edge of said seat-member, spaced rigid tubular bolsters of the same material as aforesaid formed on the underface of said seat-member homogeneously therewith within said skirting flange and arranged transversely of said seat-member to rest upon the bearing surfaces of said supporting elements, openings extending through the lower portions of said bolsters which rest on the bearing surfaces of said supporting elements to receive a resinous bonding cement interposed between said bolsters and said bearing-surfaces, said seat member being of a length to span the distance between at least two adjacent supporting elements on the gradient and of a width to provide a seat-surface, whereby a plurality of said seat-members may be arranged end-to-end to provide a continuous stadium bench-seat.

2. The subject matter of claim 1 further characterized by the said seat member having formed on its undersurface an elongated reinforcing rib member substantially U-shaped in cross-section and of the same material as aforesaid extending medially and longitudinally of said seat-member between said spaced bolsters and having the free edges of its legs homogeneous with said seat-member and with said bolsters; and, still further characterized by the said tubular bolsters each including elongated channel members with the edges of their side walls on a gradient of less height from one end to the other end and united homogeneously with the under surface of the seat-member to impart a scope to the upper seat-surface of the seat-member transversely of its length, when the bench seat member is mounted on said support elements, the web portions of the channel members being planar and having the aforesaid openings therein.

3. A bench-seat member as set forth in claim 1 wherein the supporting elements are horizontal members supported by legs and wherein an elongated and inverted channel member of fiberglass reinforced polyester resinous material is bonded to the bottom face of each of said bolsters and of a depth to have its legs wrapped around a horizontal bearing member of a supporting element, whereby said leg portions may be bonded together about said horizontal bearing member to anchor the seat-member in place.

4. A seat member for stadia or the like comprising a unitary elongated board-like member of polyester resinous material having fiberglass incorporated therein and of a length and width to span between two spaced supporting elements to provide a bench-like seat, the material of said seat member being shaped to form a smooth upper seat-face with its edge portions curved downwardly forming a continuous flange at least on its front and rear longitudinal edges; elongated rigid channel-form bolsters of said resinous material homogeneous with and depending from the underface of said seat member with their web portions lowermost and extending transversely of and adjacent each end of the seat member, respectively, to have their web portions rest upon the said supporting elements; an elongated channel-form reinforcing rib element of said resinous material positioned longitudinally and medially of and having its free edge portions homogeneous with and depending from the underface of the seat-member between said bolsters; and the web portion of said bolsters having openings therethrough, through which a resinous adhesive material, interposed between said bolsters and supporting elements, will pass to form rivet-like members, when said adhesive has set or hardened.

References Cited by the Examiner

UNITED STATES PATENTS

| | | | |
|---|---|---|---|
| 1,452,467 | 4/23 | Lambert | 52—8 |
| 2,524,769 | 10/50 | Blair et al. | 52—8 |
| 2,580,231 | 12/51 | Lamm | 52—39 |
| 2,697,931 | 12/54 | Schill | 52—189 |
| 2,722,823 | 11/55 | Summers | 52—189 |
| 2,817,389 | 12/57 | Richards | 52—8 |
| 2,854,704 | 10/58 | Gilbert | 52—8 |
| 2,939,309 | 6/60 | Sitton | 52—189 |
| 2,975,488 | 3/61 | Brauner | 18—59 |
| 3,006,689 | 10/61 | Eppink | 297—457 |
| 3,007,283 | 11/61 | Holland | 52—190 |
| 3,012,818 | 12/61 | Brown | 297—457 X |
| 3,054,643 | 9/62 | Militano | 297—440 |
| 3,061,887 | 11/62 | Clarke | 18—59 |
| 3,063,199 | 11/62 | Marcin | 52—38 |

FRANK L. ABBOTT, *Primary Examiner.*

JACOB L. NACKENOFF, HENRY C. SUTHERLAND, *Examiners.*